United States Patent
Li et al.

(10) Patent No.: US 9,818,047 B1
(45) Date of Patent: Nov. 14, 2017

(54) SYSTEM AND METHOD FOR COLOR ENHANCEMENT

(71) Applicant: MARVELL INTERNATIONAL LTD., Hamilton (BM)

(72) Inventors: Huai Dong Li, Cupertino, CA (US); Samson Huang, Saratoga, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 21 days.

(21) Appl. No.: 14/967,912

(22) Filed: Dec. 14, 2015

Related U.S. Application Data

(60) Provisional application No. 62/113,779, filed on Feb. 9, 2015.

(51) Int. Cl.
| | | |
|---|---|---|
| G06K 9/00 | (2006.01) | |
| G06K 9/62 | (2006.01) | |
| G06T 7/40 | (2017.01) | |
| G06K 9/46 | (2006.01) | |
| G06T 5/00 | (2006.01) | |
| G06K 9/52 | (2006.01) | |

(52) U.S. Cl.
CPC ......... G06K 9/6267 (2013.01); G06K 9/4652 (2013.01); G06K 9/4661 (2013.01); G06K 9/52 (2013.01); G06T 5/00 (2013.01); G06T 7/408 (2013.01); G06K 2009/4666 (2013.01); G06T 2207/20021 (2013.01); G06T 2207/20048 (2013.01); G06T 2207/20172 (2013.01)

(58) Field of Classification Search
None
See application file for complete search history.

(56) References Cited

U.S. PATENT DOCUMENTS

| | | | | |
|---|---|---|---|---|
| 7,551,774 | B2 * | 6/2009 | Matsubara | H04N 9/68 348/222.1 |
| 8,130,236 | B2 * | 3/2012 | Quan | G09G 5/02 345/589 |
| 2005/0185839 | A1 * | 8/2005 | Matsubara | H04N 9/68 382/167 |
| 2009/0195551 | A1 * | 8/2009 | Quan | G09G 5/02 345/600 |

* cited by examiner

Primary Examiner — Feng Niu

(57) ABSTRACT

Apparatus, methods, and other embodiments associated with image processing operations are disclosed that provide image color enhancement. According to one embodiment, an apparatus includes zone classifier logic to map base chrominance components of pixels of color data to zones within a color space, where each zone is assigned a gain value. Saturation detection logic generates saturation values from the base chrominance components for each pixel of the color data. Saturation transformation logic transforms the saturation values to sigmoidal output values based on a sigmoidal transformation model. Chrominance enhancement logic generates enhanced chrominance components for each pixel of the color data based on the base chrominance components, the saturation values, the sigmoidal output values, and gain values assigned to the zones to which the base chrominance components are mapped.

20 Claims, 7 Drawing Sheets

SYSTEM AND METHOD FOR COLOR ENHANCEMENT

CROSS REFERENCE TO RELATED APPLICATIONS

This patent disclosure claims the benefit of U.S. Provisional Application Ser. No. 62/113,779 filed on Feb. 9, 2015, which is incorporated herein by reference.

BACKGROUND

In image processing, one goal may be to achieve color enhancement of a color image. Colors can be represented in different types of color spaces. Depending on the desired result of the image processing, one type of color space may be more appropriate to operate in than another type of color space. For example, to achieve a first particular type of color enhancement of an image, it may be appropriate to operate in a red, green, blue (RGB) color space. To achieve a second particular type of color enhancement of an image, it may be appropriate to operate in a hue, saturation, value (HSV) color space. Today, many digital imaging systems (e.g., cameras) are designed to operate in the popular RGB color space. However, achieving certain types of high quality color enhancements can be very challenging, and possibly cost prohibitive, especially when operating in the RGB color space. In particular, it can be very challenging to enhance the skin tone of a person in a color image while also enhancing, for example, color saturation of other portions of the image in an efficient and cost-effective manner.

SUMMARY

In general, in one aspect this specification discloses an image processing apparatus that includes a zone classifier module, a saturation detection module, a saturation transformation module, and a chrominance enhancement module for performing color enhancement of color images. The zone classifier module is configured to map chrominance components of a color pixel to a zone within a color space. A chrominance plane of the color space is divided into multiple zones and each zone is assigned a gain value. The saturation detection module is configured to generate a saturation value by selecting a maximum absolute value from the chrominance components of the color pixel. The saturation transformation module is configured to transform the saturation value to a sigmoidal output value based on a sigmoidal transformation model. The chrominance enhancement module is configured to generate enhanced chrominance components for the color pixel based at least in part on the original chrominance components, the saturation value, the sigmoidal output value, and a gain value assigned to a zone of the multiple zones to which the original chrominance components are mapped.

In general, in another aspect, this specification discloses a method that is performable, for example, by an image processing apparatus to provide color enhancement of color images. The method includes generating a chrominance-plane data structure defining a chrominance plane. The chrominance-plane data structure stores paired coordinates of chrominance color component values, zone index values defining zones corresponding to angular regions of the chrominance color component values radiating outward from an origin of the chrominance plane, and gain values assigned to the zones. The method also includes generating a saturation data structure storing saturation values and the paired coordinates. The saturation values are derived from and related to the paired coordinates within the saturation data structure. The method further includes generating a non-linear transformation data structure storing sigmoidal output values and the saturation values. The sigmoidal output values are derived from and related to the saturation values within the non-linear transformation data structure. The method also includes generating a chrominance enhancement model configured to apply the chrominance-plane data structure, the saturation data structure, and the non-linear transformation data structure to a color image data structure. The color image data structure stores pixels of color data. An enhanced color image data structure, storing pixels of enhanced color data, is generated by the chrominance enhancement model operating on the color image data structure.

In general, in another aspect, this specification discloses an integrated circuit device for performing color enhancement. In one embodiment, the integrated circuit device includes zone classifier logic, saturation detection logic, saturation transformation logic, and chrominance enhancement logic. Zone classifier logic is configured to map chrominance components of pixels of color data stored in an image data structure to zones within a first color space. A chrominance plane of the first color space is divided into the zones and each zone is assigned a gain value. Saturation detection logic is configured to generate saturation values by selecting a maximum absolute value from the chrominance components for each pixel of the color data. Saturation transformation logic is configured to transform the saturation values to sigmoidal output values based on a sigmoidal transformation model. Chrominance enhancement logic is configured to generate enhanced chrominance components for each pixel of the color data based at least in part on the original chrominance components, the saturation values, the sigmoidal output values, and gain values assigned to the zones to which the original chrominance components are mapped.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Described herein are examples of systems, apparatus, methods, and other embodiments associated with image processing. In particular, embodiments are described herein that are associated with color image processing for enhancing color components in color images. Enhancement of color components can result in color images that are more visually pleasing to observe, for example, by providing an increase in perceived colorfulness and saturation. Such embodiments provide for both the controlled enhancement of the skin tone of people and the enhancement of other objects/scenery in a same color image. A combination of zoned gain techniques in a chrominance color plane and non-linear (S-shape) saturation techniques are employed to enhance color images.

In one embodiment, a color image is converted from a red, green, blue (RGB) color space to a luminance, blue-chrominance, red-chrominance (Y, Cb, Cr) color space. The zoned gained techniques and the non-linear saturation techniques are applied in the (Y, Cb, Cr) color space to enhance the color image. The color image is then converted back to the (R, G, B) color space. Embodiments can be applied as one block in an image processing pipeline of multiple blocks (e.g., in a digital camera), or can be applied as a post-processing block in a separate device (e.g., in a digital color printer). Pixel data of the enhanced color image can be used to control a color display device or a color printing device, for example, to display or print the enhanced color image.

The term "sigmoidal", as used herein, refers to an S-shaped curve or function, where the "S" shape can take many forms. For example, an S-shaped curve is a non-linear curve that has a single transition point somewhere along the curve where the curvature transitions from one direction of curvature to another direction of curvature. Furthermore, an S-shaped curve can have the same or different amounts of curvature before and after the transition point.

The term "sigmoidal output value", as used herein, refers to an output value from a sigmoidal function or model, in response to an input value.

The term "color pixel", as used herein, refers to the color data associated with a picture element data structure of an image having color components (e.g., red, green, blue color components).

The term "base chrominance components", as used herein, refer to the original chrominance components of a color pixel before enhancement.

Figure 1:
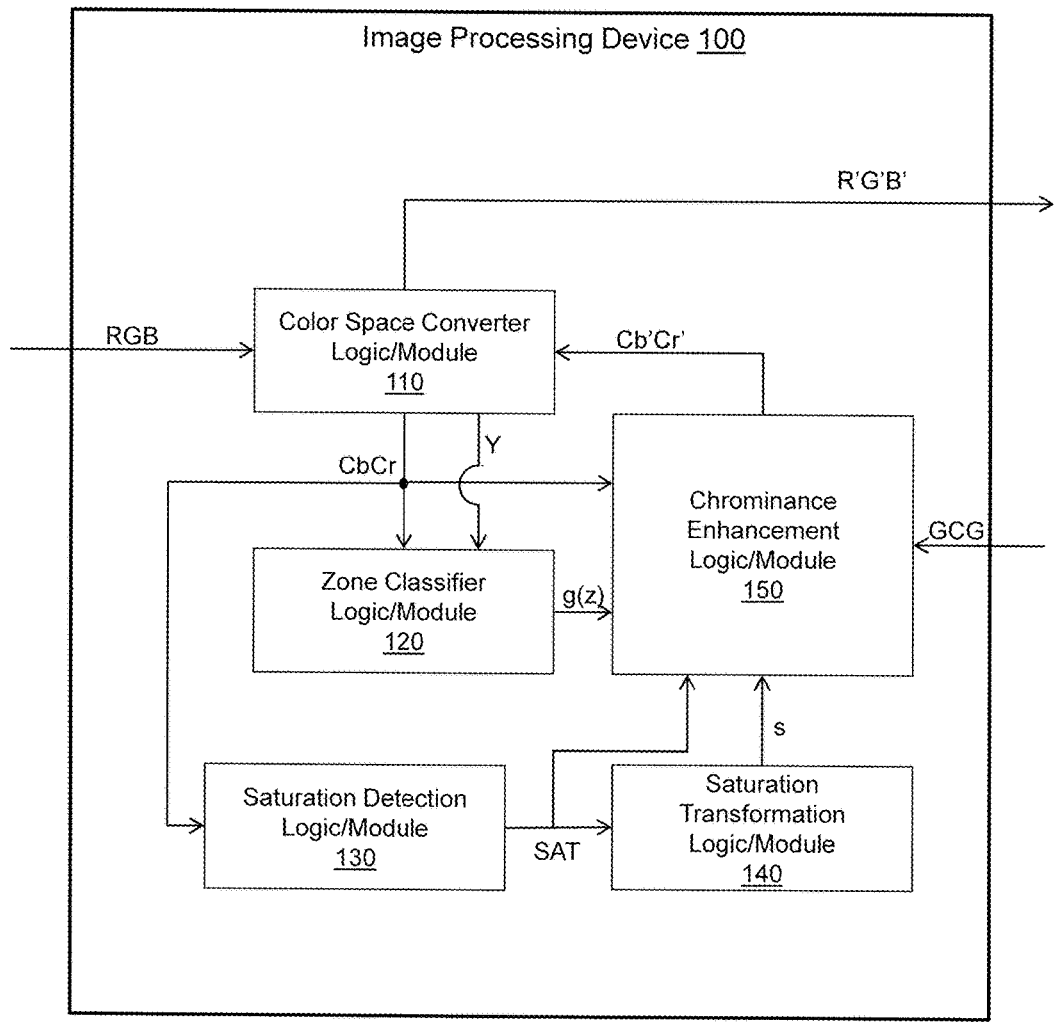
FIG. 1 illustrates one embodiment of an image processing device configured to enhance the color of color images.

FIG. 1 illustrates one embodiment of an image processing device 100 configured to enhance color images. The image processing device 100 is configured to input RGB color components of color image pixels and output enhanced R'G'B' color components (where the apostrophe (') indicates "enhanced"). In one embodiment, much of the image processing is performed in the YCbCr color space. The RGB color components are first converted to YCbCr color components. Then the chrominance color components Cb and Cr are enhanced to form enhanced color components YCb'Cr'. Finally, the YCb'Cr' color components are converted back to the RGB color space as enhanced R'G'B' color components which are output from the image processing device 100.

The image processing device 100 includes color space converter logic 110, zone classifier logic 120, saturation detection logic 130, saturation transformation logic 140, and chrominance enhancement logic 150. In one embodiment, the image processing device 100 is implemented on a chip (i.e., a system-on-chip or SOC configuration) including one or more integrated circuits configured to perform one or more of the functions described herein. In another embodiment, the logics of the image processing device 100 may be part of an executable algorithm configured to perform the functions of the logics where the algorithm is stored in a non-transitory medium.

Other embodiments may provide different logics or combinations of logics that provide the same or similar functionality as the image processing device 100 of FIG. 1. In one embodiment, the image processing device 100 is an executable application including algorithms and/or program modules configured to perform the functions of the logics. The application is stored in a non-transitory computer storage medium. That is, in one embodiment, the logics of the image processing device 100 are implemented as modules of computer-executable instructions stored on a computer-readable medium.

Figure 2:
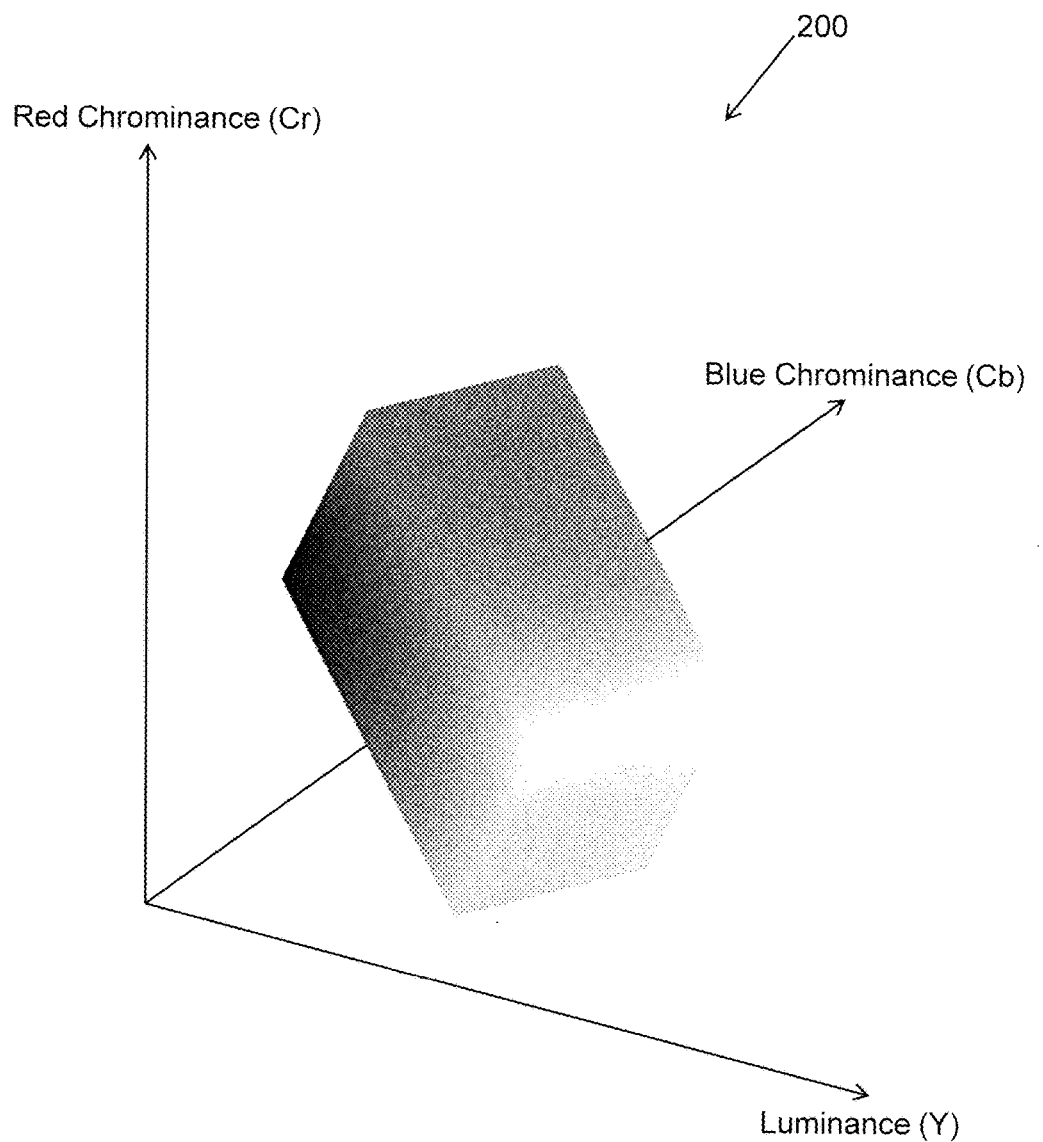
FIG. 2 illustrates a color space having Luminance, red chrominance, and blue chrominance color components.

The RGB color space is an additive color space based on the RGB color model. The RGB color space is defined by the three red, green, and blue additive primary colors, and can produce any color that is the combination defined by the primary colors. The YCbCr color space includes a luminance component (Y) and Cb and Cr blue and red chrominance components (sometimes referred to as the blue-difference and red-difference chrominance components). FIG. 2 illustrates the YCbCr color space 200 having luminance, red chrominance, and blue chrominance component axes. However, since FIG. 2 is shown in shades of gray instead of colors herein, the chromaticity of the YCbCr color space 200 cannot be fully appreciated in FIG. 2.

Referring again to FIG. 1, color space converter logic 110 is configured to convert color components of pixels of color data (e.g., stored in an image data structure) from a first color space (e.g., RGB) to a second color space (e.g., YCbCr), and vice versa. In one embodiment, the following formulas are implemented by color space converter logic 110 to perform the conversions.

RGB to YCbCr Conversion:

$$Y=0.299*R+0.587*G+0.114*B,$$

$$Cb=-0.169*R-0.331*G+0.5*B,$$

$$Cr=0.5*R-0.419*G-0.0813*B.$$

YCbCr to RGB Conversion:

$$R=Y+1.402*Cr,$$

$$G=Y-0.344*Cb-0.714*Cr,$$

$$B=Y+1.772*Cb.$$

As shown in FIG. 1, RGB color components (e.g., stored in a first image data structure) are input to color space converter logic 110. Color space converter logic 110 converts the RGB color components to YCbCr color components in accordance with the formulas above (and stores the YCbCr color components in a second image data structure, for example). Color space converter logic 110 also outputs the CbCr chrominance components to zone classifier logic 120, saturation detection logic 130, and chrominance enhancement logic 150 and retains the luminance component Y. In accordance with one embodiment, color conversion is represented within the image processing device 100 as a color space transformation data structure 510 (see FIG. 5) which is discussed in more detail herein with respect to FIG. 5 and FIG. 6.

Figure 3:
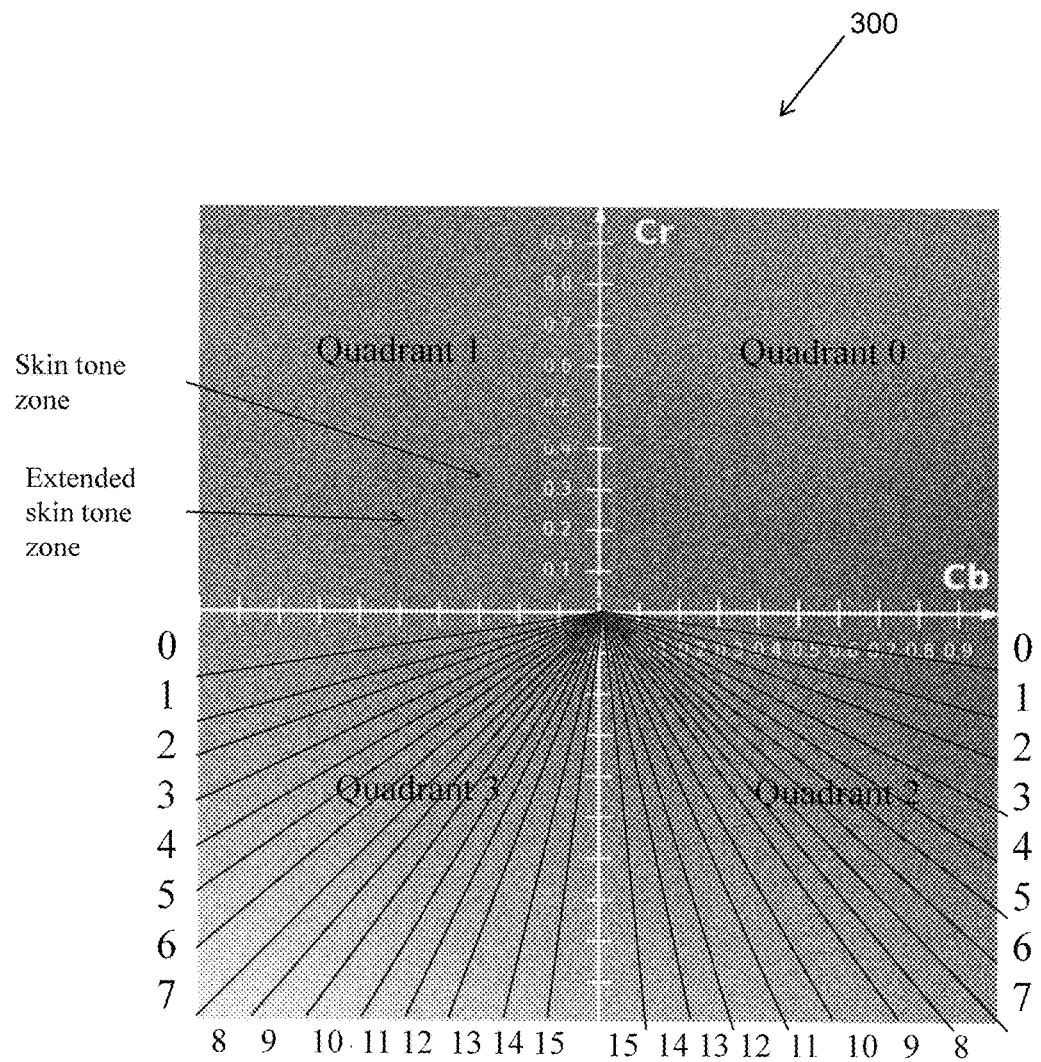
FIG. 3 illustrates an embodiment of a chrominance plane of the color space of FIG. 2 that is divided into zones.

In one embodiment, zone classifier logic 120 is configured to receive the YCbCr components of pixels of color data from color space converter logic 110 and map the chrominance components, CbCr, to multiple zones within the YCbCr color space 200. A chrominance plane of the YCbCr color space is divided into the multiple zones and each zone is assigned a gain value. FIG. 3 illustrates an embodiment of a chrominance plane 300 of the color space 200 of FIG. 2 that is divided into zones. In FIG. 3, the chrominance values Cb and Cr are normalized to one (1.0). In accordance with one embodiment, the chrominance plane 300 is represented within the image processing device 100 as a chrominance-plane data structure 520 (see FIG. 5) which is discussed in more detail herein with respect to FIG. 5 and FIG. 6. However, since FIG. 3 is shown in shades of gray instead of colors herein, the chrominance of the CbCr chrominance plane cannot be fully appreciated in FIG. 3.

Referring to FIG. 3, based on a CbCr pair for each pixel, each pixel can be classified into an angular zone (z) in one of four (4) quadrants (0-4) of the chrominance plane 300. As shown in FIG. 3, each quadrant has sixteen (16) angular zones (0-15). Therefore, a total of sixty-four (64) angular zones are defined in the chrominance plane 300. A gain value, g(z), is assigned to each of the angular zones. In this manner, a CbCr pair of chrominance components of a pixel can be associated with a gain value, g(z), based on the chrominance plane 300.

In accordance with one embodiment, each angle radiating radially outward from an origin of the chrominance plane 300 corresponds to a hue. Therefore, each angular zone of the chrominance plane 300 corresponds to an angular region of hues radiating outward from the origin of the chrominance plane 300. Furthermore, in one embodiment, gain values may be interpolated between angular zones for a given CbCr pair to obtain a more refined gain value. For a particular angle (hue), however, the gain value is kept the same such that saturation is not corrupted, in accordance with one embodiment.

Also, as seen in FIG. 3, a rectangular skin tone zone and a rectangular extended skin tone zone are provided. The skin tone zone and the extended skin tone zone represent CbCr color components often associated with the skin tone of people. The skin tone zone is assigned its own gain value and the extended skin tone zone is also assigned its own gain value. The extended skin tone zone surrounds the skin tone zone. A CbCr pair of chrominance components of a pixel classified in the skin tone zone or the extended skin tone zone is associated with the corresponding gain value.

In one embodiment, the skin tone zone is defined by the predefined values skin_Y_th, skin_Cb_high, skin_Cb_low, skin_Cr_high, and skin_Cr_low. The current pixel (having color components YCbCr) is classified to be in the skin tone zone when the following conditions are met:

[Y>=skin_Y_th] AND [(Cb+512)<skin_Cb_high] AND [(Cb+512)>skin_Cb_low] AND [(Cr+512)<skin_Cr_high] AND [(Cr+512>skin_Cr_low].

Furthermore, in one embodiment, the extended skin tone zone is defined by the predefined values subSkin_Cb_high, subSkin_Cb_low, subSkin_Cr_high, and subSkin_Cr_low. The current pixel is classified to be in the extended skin tone zone if the current pixel is not classified in the skin tone zone and its YCbCr values meet the following conditions:

[(Cb+512)<subSkin_Cb_high] AND [(Cb+512)>subSkin_Cb_low] AND [(Cr+512)<subSkin_Cr_high] AND [(Cr+512)>subSkin_Cr_low].

Referring again to FIG. 1, in one embodiment, saturation detection logic 130 is configured to generate saturation values (SAT) as defined herein by calculating from the base chrominance components CbCr for each pixel of color data. For example, SAT can be defined as SAT=max (|Cb|, |Cr|) or SAT=SQRT(|Cb|²+|Cr|²). As a result, saturation is a distance from the origin of the chrominance plane 300 along a particular hue angle. In accordance with one embodiment, the saturation values are stored within a saturation data structure 530 (see FIG. 5) of the image processing device 100, which is discussed in more detail herein with respect to FIG. 5 and FIG. 6.

In one embodiment, saturation transformation logic 140 is configured to transform the saturation values "SAT", from saturation detection logic 130, to sigmoidal output values "s" based on a non-linear (e.g., sigmoidal) transformation model. The non-linear transformation model transforms saturation values "SAT" to sigmoidal output values "s" based on an S-shaped function or S-curve.

Figure 4:
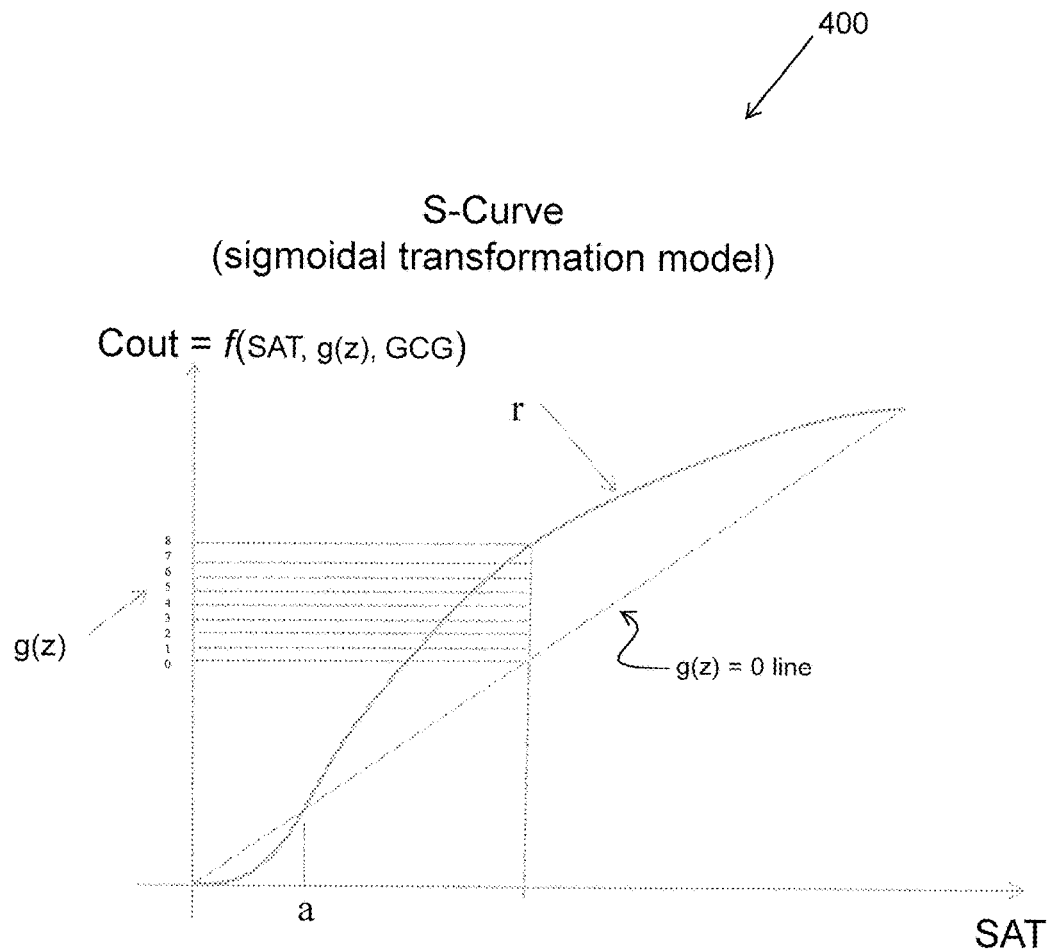
FIG. 4 illustrates a graph of a non-linear transformation model which transforms saturation values based on an S-shaped function.

Saturation transformation logic 140 generates the sigmoidal output values "s" based on input saturation values SAT. In one embodiment, the basic S-shaped function generated by the non-linear transformation model of saturation transformation logic 140 is defined by the following formulas:

$$s=a^{1-r}SAT^r,$$

for 0≤SAT≤a, and $$s=1-(1-a)^{1-r}(1-SAT)^r,$$

for a<SAT≤1, where "a" controls the transition point of curvature in the S-curve and r controls the shape of the S-curve (e.g., see FIG. 4). The values for "a" and "r" may be predetermined (e.g., based on off-line optimization) or may be selectable by a user of the image processing device 100, in accordance with various embodiments. In accordance with one embodiment, the sigmoidal output values "s" are stored within a non-linear transformation data structure 540 (see FIG. 5) of the image processing device 100, which is discussed in more detail herein with respect to FIG. 5 and FIG. 6.

The sigmoidal output values (s) are then passed on to chrominance enhancement logic 150. In one embodiment, chrominance enhancement logic 150 is configured to generate enhanced chrominance components (Cb'Cr') for each pixel of the color data based on the base chrominance components (CbCr), the saturation values (SAT), the sigmoidal output values (s), and gain values (g(z)) assigned to the zones to which the base chrominance components (CbCr) are mapped in the chrominance plane 300 by zone classifier logic 120. Also, in one embodiment, chrominance enhancement logic 150 generates the enhanced chrominance components (Cb'Cr') further based on a global color gain (GCG) value. In accordance with one embodiment, chrominance enhancement logic 150 employs a chrominance enhancement model 550 (see FIG. 5) of the image processing device 100, which is discussed in more detail herein with respect to FIG. 5 and FIG. 6.

For example, in one embodiment, chrominance enhancement logic 150 generates enhanced chrominance components (Cb'Cr') based on the following chrominance enhancement model 540:

$$C_{out}=SAT+[s-SAT]*g(z)*GCG/64,$$

where "s" is a function of "SAT"; and $Cb'=(C_{out}/SAT)*Cb$ and $Cr'=(C_{out}/SAT)*Cr.$ FIG. 4 illustrates a graph 400 showing one embodiment of $C_{out}$ where $C_{out}$ is a function of SAT, zone gain g(z), and global color gain GCG, or $C_{out}=f(SAT, g(z), GCG)$ as given above herein. As seen in FIG. 4, if g(z) is zero (0), then $C_{out}$=SAT, the saturation value, and results in a straight line. As g(z) increases (e.g., from 0 to 8 by steps of one as shown in FIG. 4), the S-shape of the S-curve becomes more pronounced. For example, g(z) may change (e.g., increase) as the CbCr values for various color pixels cause the associated zone to change. Similarly, if GCG is zero (0), then $C_{out}$=SAT, the saturation value, and results in a straight line. As GCG increases from zero (0), the S-shape of the S-curve becomes more pronounced.

In this manner, color is enhanced in a color image based significantly on a non-linear manipulation of saturation. A distribution of gains across angular zones of hue in the chrominance plane of the YCbCr color space, along with a non-linear treatment of saturation, results in enhanced chrominance components Cb'Cr' for pixels in a color image. Furthermore, as shown in FIG. 1, the enhanced chrominance components Cb'Cr' may be fed back into color space converter logic 110 and converted back to the red, green, blue color space as enhanced color components R'G'B' which are output from the image processing device 100. That is, from a black box perspective, RGB color components are input to the image processing device 100 and are processed to generate enhanced R'G'B' color components which are then output from the image processing device 100.

Figure 5:
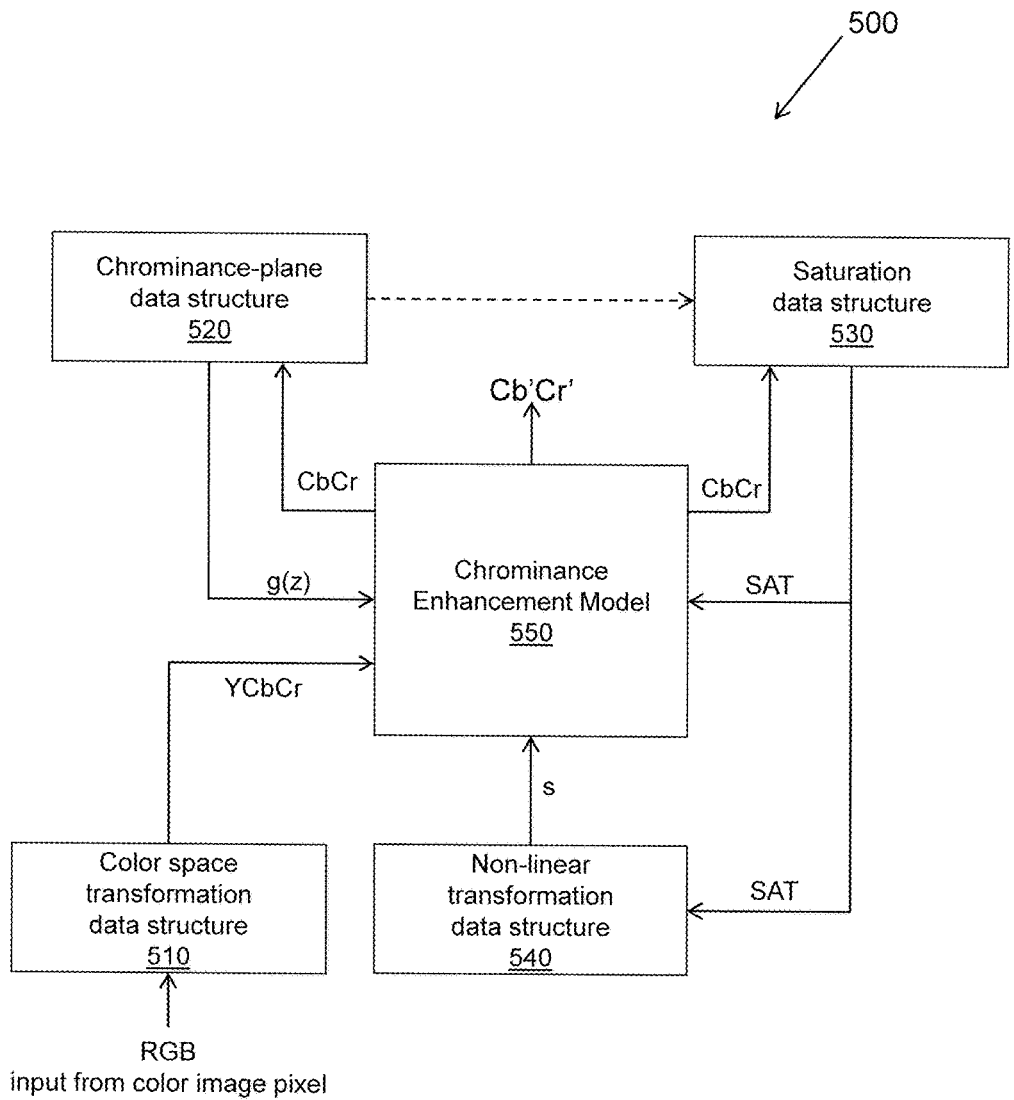
FIG. 5. Illustrates one embodiment of an architecture of data structures and a chrominance enhancement model configured to enhance color images.
Figure 6:
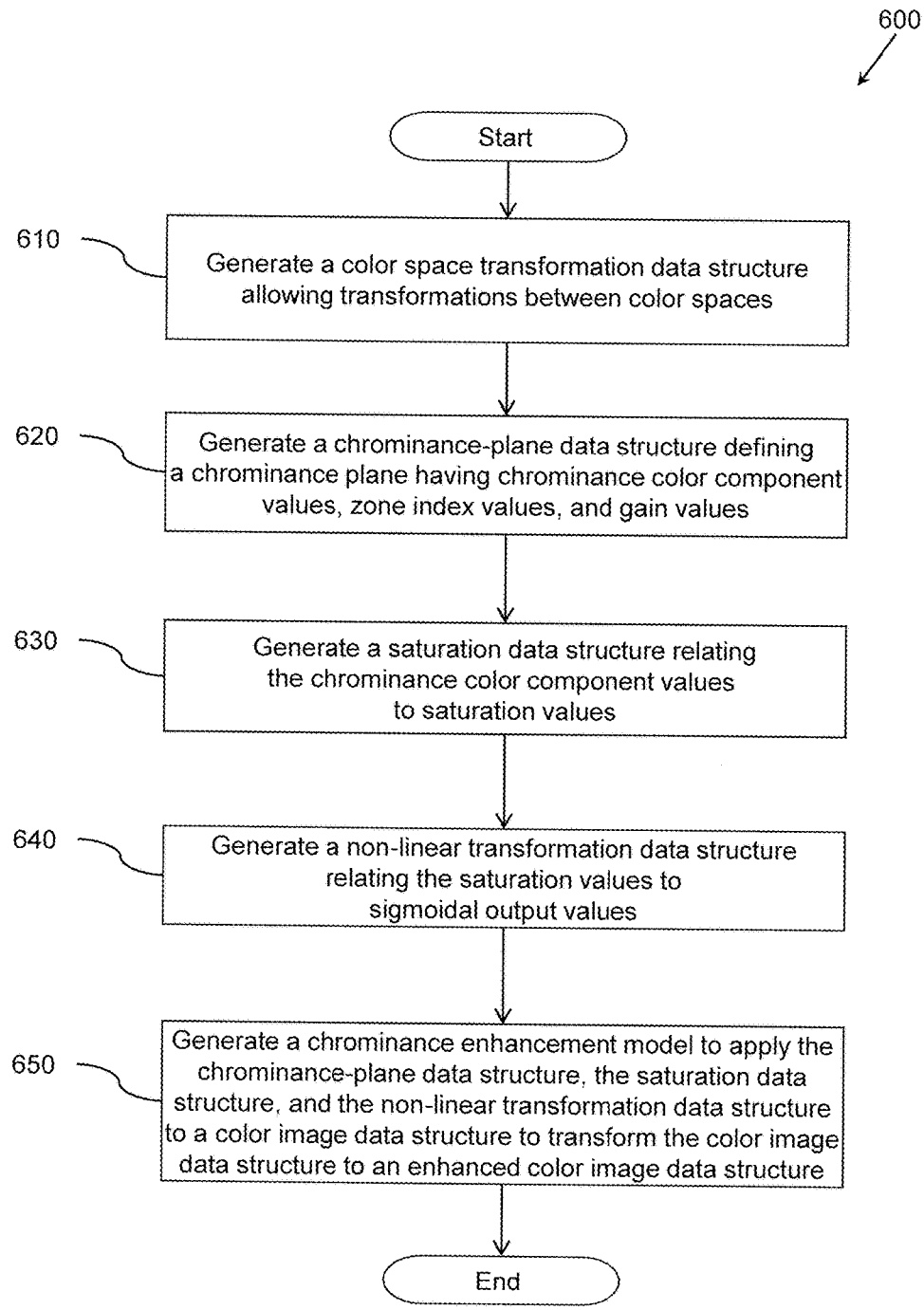
FIG. 6 illustrates one embodiment of a method, performable by the image processing device of FIG. 1, for enhancing color in color images.

FIG. 5. Illustrates one embodiment of an architecture 500 of data structures and a chrominance enhancement model configured to enhance color images. FIG. 6 illustrates one embodiment of a method 600, performable by the image processing device 100 of FIG. 1, for enhancing color in color images using the architecture 500 of FIG. 5.

Method 600 is implemented to be performed by the image processing device 100 of FIG. 1, or by another computing device configured with an algorithm of method 600. That is, method 600 will be described from the perspective that the architecture 500 of FIG. 5 (data structures and model) can be generated by the image processing device 100 or off-line by a computing device. The architecture 500 can then implemented within the image processing device 100 such that the image processing device 100 may receive a color image data structure of image pixel data which can be color enhanced by applying the architecture 500.

The image pixel data may be acquired by and/or originate from an image related device such as, for example, a still-image camera device, a video camera device, a scanner, or an image storage device. In accordance with one embodiment, the image processing device 100 may be a part of the image related device. In accordance with another embodiment, the image processing device 100 may be separate from the image related device and may be configured to operably connect to the image related device via an operable connection (e.g., via a network connection).

Upon initiating method 600 at 610, a color space transformation data structure 510 is generated, allowing transformations between color spaces. The color space transformation data structure 510 stores a plurality of color components of a first color space and a plurality of color components of a second color space. The color components in the first color space are related to (associated with) the color components of the second color space in a one-to-one correspondence, in accordance with one embodiment. For example, the color space transformation data structure 510 stores a plurality of RGB color component values that are mapped to a plurality of YCbCr color component values, and vice versa, in accordance with one embodiment. In one embodiment, the color space transformation data structure 510 is generated by color space converter logic 110 of the imaging processing device 100. In another embodiment, the color space transformation data structure 510 is generated off-line by another computing device.

At 620, a chrominance-plane data structure 520 is generated defining a chrominance plane (e.g., as described with respect to FIG. 3). The chrominance-plane data structure 520 stores a plurality of paired coordinates of chrominance color component values CbCr, a plurality of zone index values defining a plurality of zones, and a plurality of gain values assigned to the plurality of zones in one-to-one correspondence. The plurality of zones correspond to angular regions of the chrominance color component values radiating outward from an origin of the chrominance plane. Furthermore, two of the plurality of zones may correspond to a skin tone zone and an extended skin tone zone surrounding the skin tone zone. The skin tone zone and the extended skin tone zone are each assigned their own gain value. In one embodiment, the chrominance-plane data structure 520 is generated by zone classifier logic 120 of the imaging processing device 100. In another embodiment, the chrominance plane data structure 520 is generated off-line by another computing device.

At 630, a saturation data structure 530 is generated which stores a plurality of saturation values and the plurality of paired coordinates CbCr. The plurality of saturation values are derived from and related to (associated with) the plurality of paired coordinates within the saturation data structure 530 in a one-to-one correspondence, in accordance with one embodiment. The saturation data structure 530 is generated by saturation detection logic 130 of the imaging processing device 100, in one embodiment. In another embodiment, the saturation data structure 530 is generated off-line by another computing device.

At 640, a non-linear transformation data structure 540 is generated which stores a plurality of sigmoidal output values and the plurality of saturation values. The plurality of sigmoidal output values are derived from and related to (associated with) the plurality of saturation values within the non-linear transformation data structure in a one-to-one-correspondence, in accordance with one embodiment. The non-linear transformation data structure 540 is generated by saturation transformation logic 140 of the imaging processing device 100, in one embodiment. In another embodiment, the non-linear transformation data structure 540 is generated off-line by another computing device.

At 650, a chrominance enhancement model 550 is generated. The chrominance enhancement model 550 is configured to apply the color space transformation data structure 510, the chrominance-plane data structure 520, the saturation data structure 530, and the non-linear transformation data structure 540 to the color image data structure. The chrominance enhancement model 550 transforms the color image data structure to an enhanced color image data structure or generates an enhanced color image data structure from the color image data structure. In one embodiment, the chrominance enhancement model 550 is generated by chrominance enhancement logic 150 of the imaging processing device 100. In another embodiment, the chrominance enhancement model is generated off-line by another computing device.

In accordance with one embodiment, the logics of the image processing device 100 of FIG. 1 are configured to operate on the data structures of FIG. 5 using the chrominance enhancement model 550 of FIG. 5. As an example, referring to FIG. 5, a pixel from a color image data structure of image pixel data (YCbCr) is input to (e.g., read into) the chrominance enhancement model 550 after being converted from RGB image pixel data using the color space transformation data structure 510.

Continuing with the example, the chrominance components CbCr are used by the chrominance enhancement model 550 to address the chrominance-plane data structure 520 and the saturation data structure 530. Addressing of the chrominance-plane data structure 520 returns a gain value g(z), based on a zone related to the chrominance components CbCr in the chrominance-plane data structure 520, to the chrominance enhancement model 550. Addressing of the saturation data structure 530 returns a saturation value SAT, related to the chrominance components CbCr in the saturation data structure 530, to the chrominance enhancement model 550.

Continuing with the example, the returned saturation value SAT is used to address the non-linear transformation data structure 540. Addressing of the non-linear transformation data structure 540 returns a sigmoidal output value "s", related to the saturation value SAT in the non-linear transformation data structure 540, to the chrominance enhancement model 550. In accordance with one embodiment, the chrominance enhancement model 550 operates on the image pixel data YCbCr, the gain value g(z), and the saturation value SAT to generate enhanced chrominance components Cb'Cr', as shown in FIG. 5. Also, in one embodiment, a global color gain (GCG) value may be applied by the chrominance enhancement model 550 to further adjust the enhanced chrominance components Cb'Cr'.

Finally, the original image pixel data component Y may be joined with the enhanced chrominance components Cb'Cr', forming enhanced image pixel data YCb'Cr', and the enhanced image pixel data (YCb'Cr') may be converted to an enhanced image pixel data (R'G'B') using the color space transformation data structure 510. In this manner, the data structures of FIG. 5 may be generated and operated upon by the logics of FIG. 1 to enhance pixels in a color image. Color is enhanced in a color image based significantly on a non-linear manipulation of saturation and a distribution of gains across angular zones of hue in the chrominance plane of the YCbCr color space.

Integrated Circuit Device Embodiment

Figure 7:
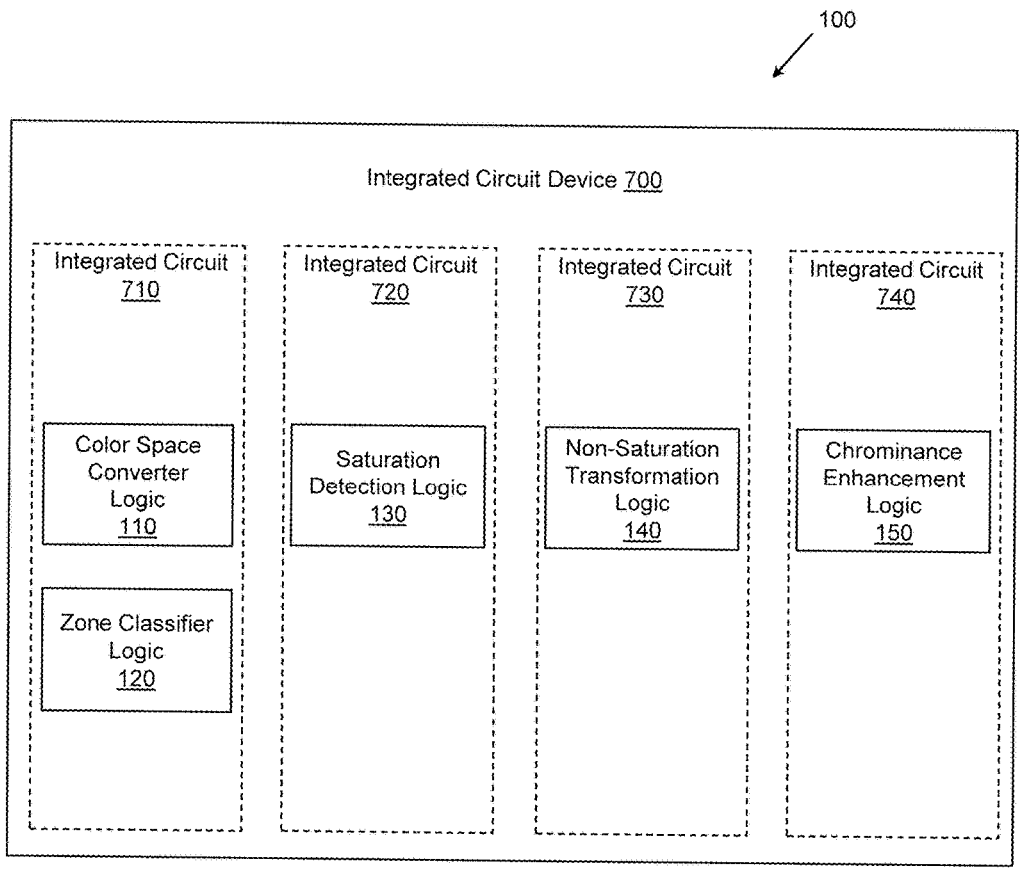
FIG. 7 illustrates one embodiment of the image processing device of FIG. 1 implemented as an integrated circuit device.

FIG. 7 illustrates one embodiment of the image processing device 100 of FIG. 1 implemented as an integrated circuit device 700. In this embodiment, the color space converter logic 110 and the zone classifier logic 120 are each embodied on the same integrated circuit 710. The saturation detection logic 130, the saturation transformation logic 140, and the chrominance enhancement logic 150 are each embodied as a separate integrated circuit 720, 730, and 740, respectively.

The circuits are connected via connection paths to communicate signals. While integrated circuits 710, 720, 730, and 740 are illustrated as separate integrated circuits, they may be integrated into a common integrated circuit device 700. Additionally, integrated circuits 710, 720, 730, and 740 may be combined into fewer integrated circuits or divided into more integrated circuits than illustrated. Similarly, the image processing device 100 of FIG. 1 may be implemented as an integrated circuit device, in accordance with certain embodiments.

In another embodiment, the color space converter logic 110, the zone classifier logic 120, the saturation detection logic 130, the saturation transformation logic 140, and the chrominance enhancement logic 150 (which are illustrated in integrated circuits 710, 720, 730, and 740) may be combined into a separate application-specific integrated circuit. In other embodiments, portions of the functionality associated with the color space converter logic 110, the zone classifier logic 120, the saturation detection logic 130, the saturation transformation logic 140, and the chrominance enhancement logic 150 may be embodied as firmware executable by a processor and stored in a non-transitory memory (e.g., a non-transitory computer storage medium).

Systems, methods, and other embodiments associated with performing color enhancement of color images have been described. In one embodiment, a chrominance-plane data structure is generated that defines a chrominance plane. The chrominance-plane data structure stores paired coordinates of chrominance color component values, zone index values defining zones corresponding to angular regions of the chrominance color component values radiating outward from an origin of the chrominance plane, and gain values assigned to the zones. A saturation data structure is generated that stores saturation values and the paired coordinates of chrominance color component values. The saturation values are derived from and related to the paired coordinates within the saturation data structure. A non-linear transformation data structure is generated that stores sigmoidal output values and the saturation values. The sigmoidal output values are derived from and related to the saturation values within the non-linear transformation data structure. A chrominance enhancement model is generated which is configured to apply the chrominance-plane data structure, the saturation data structure, and the non-linear transformation data structure to a color image data structure to generate an enhanced color image.

Definitions and Other Embodiments

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. §101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. §101.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

An "operable (or operative) connection", or a connection by which entities are "operably (or operatively) connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection. The terms "operable" and "operative", and there various forms, may be used interchangeably herein.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims.

What is claimed is:

1. An apparatus comprising:
   a processor connected to memory, wherein the processor is configured to execute instructions stored in the memory that cause the processor to implement:
   a zone classifier module configured to map at least base chrominance components of a color pixel to a zone of a plurality of zones within a first color space, wherein a chrominance plane of the first color space is divided into the plurality of zones, and wherein each zone of the plurality of zones is assigned a gain value;
   a saturation detection module configured to generate a saturation value by selecting a maximum absolute value from the base chrominance components of the color pixel;
   a saturation transformation module configured to transform the saturation value to a sigmoidal output value based on a sigmoidal transformation model; and a chrominance enhancement module configured to generate enhanced chrominance components for the color pixel based at least in part on (i) the base chrominance components, (ii) the saturation value, and (iii) an output value, wherein the output value is derived from a function of (i) the saturation value, (ii) the sigmoidal output value, (iii) gain values assigned to zones to which the base chrominance components are mapped, and (iv) a global color gain value.

2. The apparatus of claim 1, further comprising a color space converter module configured to convert color components of the color pixel from the first color space to a second color space, and from the second color space to the first color space.

3. The apparatus of claim 1, wherein the chrominance enhancement module is configured to interpolate gain values between zones of a pair of base chrominance components to create a refined gain value used to generate the enhanced chrominance components for the color pixel.

4. The apparatus of claim 1, wherein at least one zone of the plurality of zones corresponds to a skin tone zone in the chrominance plane of the first color space.

5. The apparatus of claim 1, wherein at least one zone of the plurality of zones corresponds to an extended skin tone zone in the chrominance plane of the first color space.

6. The apparatus of claim 1, wherein at least a portion of the plurality of zones in the chrominance plane of the first color space correspond to angular regions of hue radiating outward from an origin of the chrominance plane.

7. The apparatus of claim 1, wherein the base chrominance components include a blue chrominance component and a red chrominance component.

8. The apparatus of claim 1, wherein the enhanced chrominance components include a blue chrominance component and a red chrominance component.

9. The apparatus of claim 1, wherein the first color space includes a luminance component, a blue chrominance component, and a red chrominance component.

10. A computer-implemented method comprising:
generating a chrominance-plane data structure defining a chrominance plane, wherein the chrominance-plane data structure stores:
(i) a plurality of paired coordinates of chrominance color component values,
(ii) a plurality of zone index values defining a plurality of zones corresponding to angular regions of the chrominance color component values radiating outward from an origin of the chrominance plane, and
(iii) a plurality of gain values assigned to the plurality of zones;
generating a saturation data structure storing a plurality of saturation values and the plurality of paired coordinates, wherein the plurality of saturation values are derived from and related to the plurality of paired coordinates within the saturation data structure;
generating a non-linear transformation data structure storing a plurality of sigmoidal output values and the plurality of saturation values, wherein the plurality of sigmoidal output values are derived from and related to the plurality of saturation values within the non-linear transformation data structure; and
generating a chrominance enhancement model configured to apply the chrominance-plane data structure, the saturation data structure, and the non-linear transformation data structure to a color image data structure, storing pixels of color data, to generate an enhanced color image data structure storing pixels of enhanced color data based at least in part on (i) the chrominance color component values, (ii) the plurality of saturation values, and (iii) output values, wherein the output values are derived from functions of (i) the plurality of saturation values, (ii) the plurality of sigmoidal output values, (iii) gain values assigned to zones of the chrominance color component values, and (iv) a global color gain value.

11. The method of claim 10, wherein the chrominance enhancement model is further configured to interpolate gain values between zones of a pair of chrominance components to create a refined gain value used to generate the enhanced color image data structure.

12. The method of claim 10, further comprising generating a color space transformation data structure storing a plurality of color components of a first color space and a plurality of color components of a second color space, wherein the plurality of color components of the first color space are related to the plurality of color components of the second color space, allowing a transformation between the first color space and the second color space.

13. The method of claim 12, wherein the color components of the first color space are red, green, and blue color components, and the color components of the second color space are luminance, blue chrominance, and red chrominance color components.

14. The method of claim 10, wherein the chrominance-plane data structure stores:
a second plurality of zone index values defining a skin tone zone substantially in a single upper-left quadrant of the chrominance plane; and
a second gain value assigned to the second plurality of zone index values.

15. The method of claim 14, wherein the chrominance-plane data structure stores:
a third plurality of zone index values defining an extended skin tone zone surrounding the skin tone zone; and
a third gain value assigned to the third plurality of zone index values.

16. An integrated circuit device, the integrated circuit device comprising:
zone classifier logic configured to map at least base chrominance components of pixels of color data stored in an image data structure to a plurality of zones within a first color space, wherein a chrominance plane of the first color space is divided into the plurality of zones, and wherein each zone of the plurality of zones is assigned a gain value;
saturation detection logic configured to generate saturation values by selecting a maximum absolute value from the base chrominance components for each pixel of the color data;
saturation transformation logic configured to transform the saturation values to sigmoidal output values based on a sigmoidal transformation model; and
chrominance enhancement logic configured to generate enhanced chrominance components for each pixel of the color data based at least in part on (i) the base chrominance components, (ii) the saturation values, and (iii) output values, wherein the output values are derived from functions of (i) the saturation values, (ii) the sigmoidal output values, (iii) gain values assigned to zones to which the base chrominance components are mapped, and (iv) a global color gain value.

17. The integrated circuit device of claim 16, further comprising color space converter logic configured to convert color components of the pixels of color data from the first color space to a second color space, and from the second color space to the first color space.

18. The integrated circuit device of claim 16, wherein at least one zone of the plurality of zones corresponds to a skin tone zone in the chrominance plane of the first color space.

19. The integrated circuit device of claim 16, wherein at least one zone of the plurality of zones corresponds to an extended skin tone zone in the chrominance plane of the first color space.

20. The integrated circuit device of claim 16, wherein at least a portion of the plurality of zones in the chrominance plane of the first color space correspond to angular regions of hue radiating outward from an origin of the chrominance plane.

* * * * *